Figure 1:
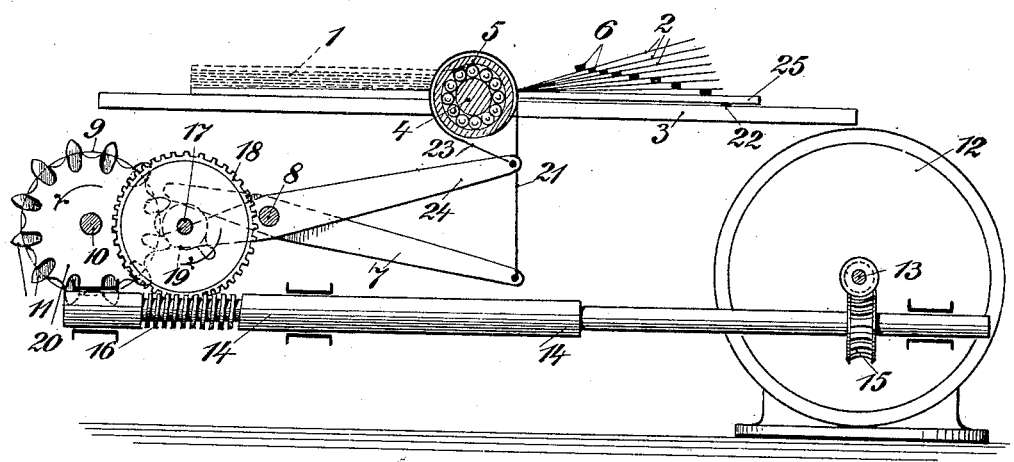

F. KLÖRIS.
DEVICE FOR TURNING OVER THE LEAVES OF BOOKS AND THE LIKE.
APPLICATION FILED DEC. 28, 1908.

996,347.

Patented June 27, 1911.

2 SHEETS—SHEET 1.

Witnesses:

Inventor:

F. KLÖRIS.
DEVICE FOR TURNING OVER THE LEAVES OF BOOKS AND THE LIKE.
APPLICATION FILED DEC. 28, 1908.
996,347.
Patented June 27, 1911.
2 SHEETS—SHEET 2.
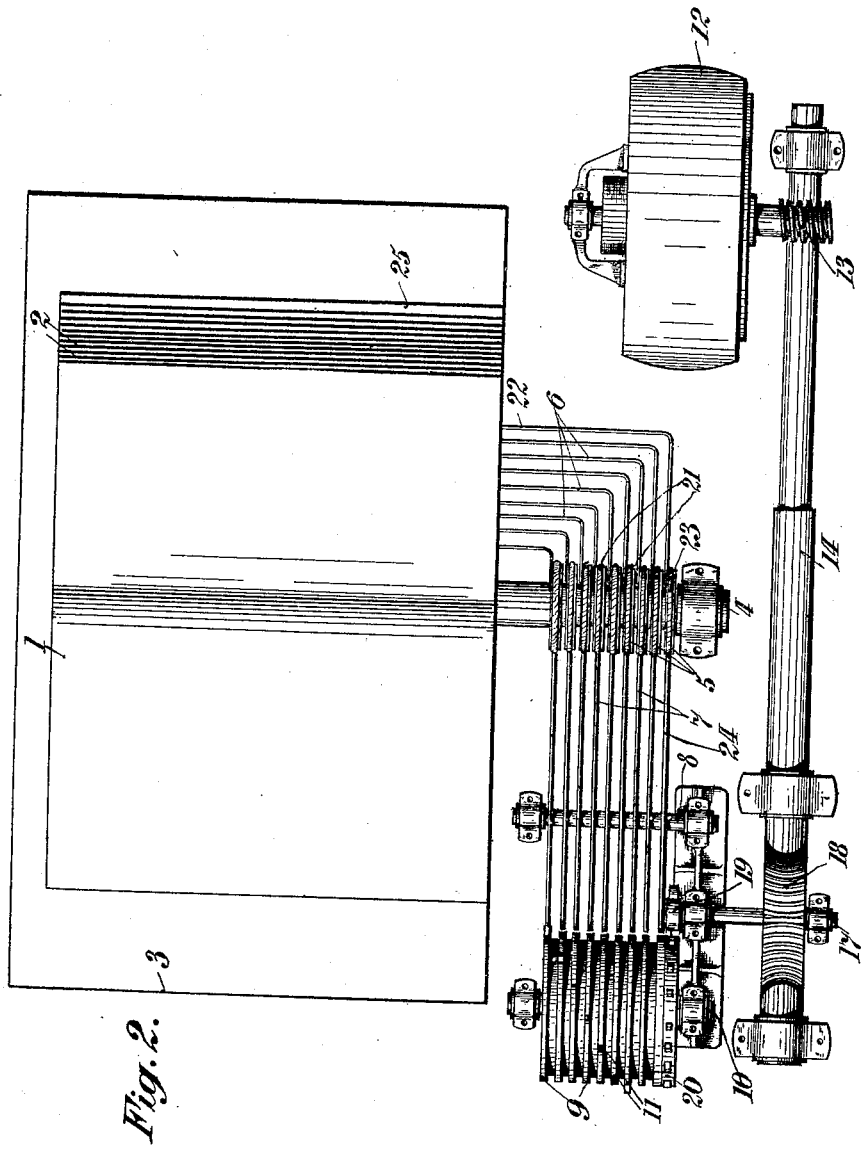

UNITED STATES PATENT OFFICE.

FRANZ KLÖRIS, OF LEIPZIG, GERMANY.

DEVICE FOR TURNING OVER THE LEAVES OF BOOKS AND THE LIKE.

996,347. Specification of Letters Patent. Patented June 27, 1911.

Application filed December 28, 1908. Serial No. 469,708.

*To all whom it may concern:*

Be it known that I, FRANZ KLÖRIS, a subject of the German Emperor, and resident of 30 Südstrasse, Leipzig, Germany, have invented certain new and useful Improvements in Devices for Turning Over the Leaves of a Book and the Like, of which the following is a specification.

My invention relates to a device for turning over the single leaves of a book, single tablets or sheets, and the like, mechanically, and at certain intervals, and in which there is provided for each leaf, or the like, a separate turning-arm. According to my invention each of these turning-arms is fastened to a separate turnable disk, which is rotated by means of a special pulling-device.

In the accompanying drawings the invention is represented in one form of construction.

Figure 1 shows the device partly in a front view and partly in section. Fig. 2 is a plan-view.

The book 1, whose leaves 2 are stitched together or united in another way, rests on a table 3. On a shaft 4 is rotatably arranged for each of the leaves a disk 5. To each of these disks 5 is fastened a turning-arm 6, which catches below one of the leaves 2. Over the circumference of each disk 5 is placed a tension-link 21 (cord, belt or the like), by means of which the respective disk can be rotated. For this purpose the free end of each tension-link is fastened to a separate two-armed lever 7. These levers 7 are turnably fixed to a shaft 8 and are successively operated at their free ends so that the leaves 2 are turned over one after the other. The levers 7 are operated by a cam-disk or roller 9 fastened on a shaft 10. The number of lugs 11 fastened on this roller 9 corresponds to the number of levers 7. In the form of construction shown in the drawing, the cam-roller 9 is actuated in the following manner. On the shaft of an electric motor 12 is fastened a worm 13 which engages a worm-wheel 15 fastened on the shaft 14. On the latter is further arranged a worm 16 engaging a worm-wheel 18 on the spindle 17. By a gear 19, 20 the rotation of the spindle 17 is transmitted to the cam-roller 9. If, in the rotation of the roller 9, one of the lugs 11 strikes against the free end of the respective lever 7, the latter is turned and the tension-link 21 is wound off from the respective disk 5. Hereby the latter is turned, in consequence of which one of the leaves 2 is turned over by means of the turning-arm 6 fastened on said disk. In order to turn back all the leaves into their initial position there has been provided a separate turning-arm 22, which catches under the cover 25 of the book and is likewise fastened to a disk pivotally arranged on the shaft 4. The tension link 23 fastened to this disk is wound around the latter in a direction opposite to that of the other tension-links 21. With the free end of the tension-link 23 there is connected a lever 24, likewise pivotally journaled on the shaft 8, and likewise operated by the cam-roller 9.

What I claim as my invention and desire to secure by Letters Patent is:—

In a device of the kind described, in combination a shaft, a number of disks loosely turnable on the said shaft, a turning-arm on each of the said disks and adapted to catch under one of the leaves to be turned, a tension-link wound around each of the said disks, a number of pivotally arranged levers, each of the latter being connected to one of the said tension-links, a roller provided with a number of lugs and adapted to operate the said levers in succession, means to rotate said roller, a disk also loosely turnable on the said shaft, a turning arm fastened to the last said disk, a tension-link wound around the last said disk in a direction opposite to that of the other tension-links, a lever coaxially arranged to the first said levers, the last said tension link being connected with the last said lever and the latter being also operated by said roller, substantially as and for the purpose set forth.

In testimony whereof I have hereunto signed my name this 15th day of December 1908, in the presence of two subscribing witnesses.

FRANZ KLÖRIS.

Witnesses:
RUDOLPH FRICKE,
HUGO BEYER.

---

Copies of this patent may be obtained for five cents each, by addressing the "Commissioner of Patents, Washington, D. C."